United States Patent
Ito

(10) Patent No.: US 10,133,326 B2
(45) Date of Patent: Nov. 20, 2018

(54) INFORMATION PROCESSING APPARATUS, METHOD FOR CONTROLLING INFORMATION PROCESSING APPARATUS, AND STORAGE MEDIUM FOR ESTABLISHING LINK-UP BETWEEN COMMUNICATION DEVICES

(71) Applicant: CANON KABUSHIKI KAISHA, Tokyo (JP)

(72) Inventor: Hiroki Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/064,132

(22) Filed: Mar. 8, 2016

(65) Prior Publication Data

US 2016/0266623 A1    Sep. 15, 2016

(30) Foreign Application Priority Data

Mar. 10, 2015  (JP) ................ 2015-047098

(51) Int. Cl.
  *G06F 1/24*   (2006.01)
  *G06F 1/26*   (2006.01)
  *G06F 13/36*  (2006.01)

(52) U.S. Cl.
  CPC .......... *G06F 1/24* (2013.01); *G06F 1/26* (2013.01); *G06F 13/36* (2013.01)

(58) Field of Classification Search
  None
  See application file for complete search history.

(56) References Cited

U.S. PATENT DOCUMENTS

| 5,070,450 | A | * | 12/1991 | Holman, Jr. | G06F 1/24 713/1 |
| 5,390,324 | A | * | 2/1995 | Burckhartt | G06F 9/4406 714/23 |
| 6,148,397 | A | * | 11/2000 | Chang | G06F 1/24 713/1 |
| 6,259,286 | B1 | * | 7/2001 | Papaliolios | G11C 5/143 327/142 |
| 2002/0010856 | A1 | * | 1/2002 | Kawasaki | G06F 11/3656 713/168 |
| 2003/0037172 | A1 | * | 2/2003 | Lacombe | G06F 11/0757 719/310 |
| 2003/0179023 | A1 | * | 9/2003 | Ishikawa | H03K 17/22 327/143 |
| 2005/0154946 | A1 | * | 7/2005 | Mitbander | G06F 11/221 714/724 |
| 2007/0001720 | A1 | * | 1/2007 | Li | G06F 1/28 327/143 |
| 2010/0049268 | A1 | * | 2/2010 | Martins | G06F 11/2025 607/9 |

(Continued)

FOREIGN PATENT DOCUMENTS

JP    2012-022477 A    2/2012

*Primary Examiner* — Kim Huynh
*Assistant Examiner* — Danny Chan
(74) *Attorney, Agent, or Firm* — Canon U.S.A., Inc. IP Division

(57) ABSTRACT

Even when activation processing of one of communication units is not completed by power supplied to a plurality of controllers, the present invention allows a reset signal output to each of the controllers to be released, thereby reducing an activation time of an entire system.

8 Claims, 6 Drawing Sheets

(56) References Cited

U.S. PATENT DOCUMENTS

2010/0169695 A1* 7/2010 Jurgilewicz .............. G06F 1/26
713/400
2012/0297099 A1* 11/2012 Kochar ................. G06F 13/102
710/104

* cited by examiner

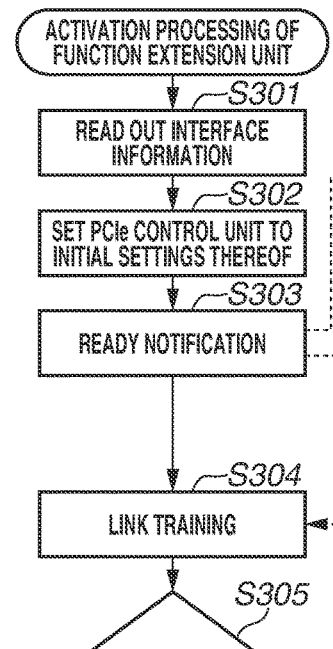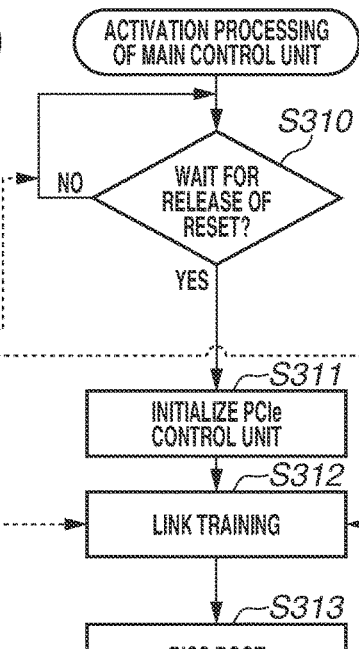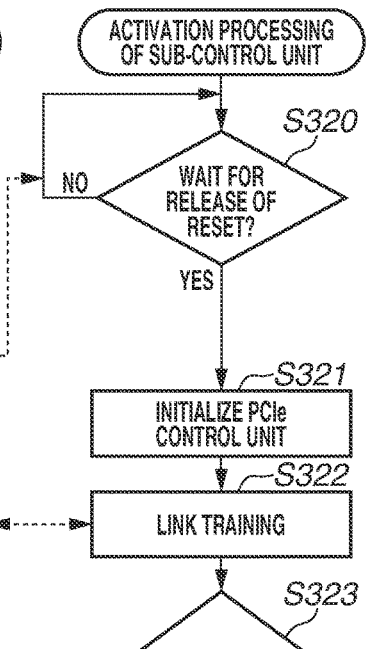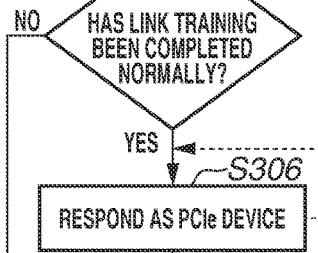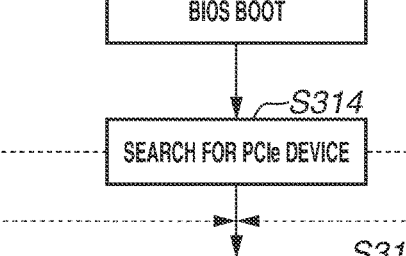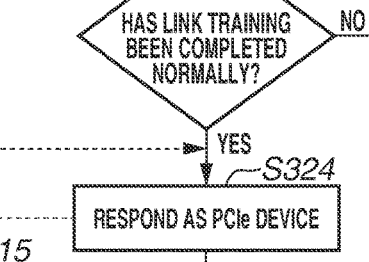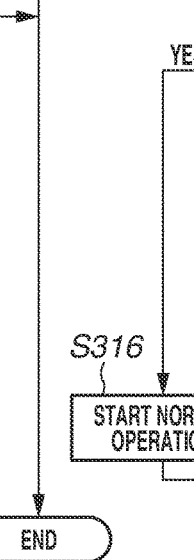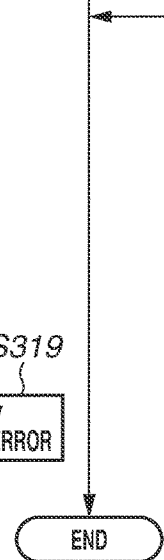
FIG.3A  FIG.3B  FIG.3C

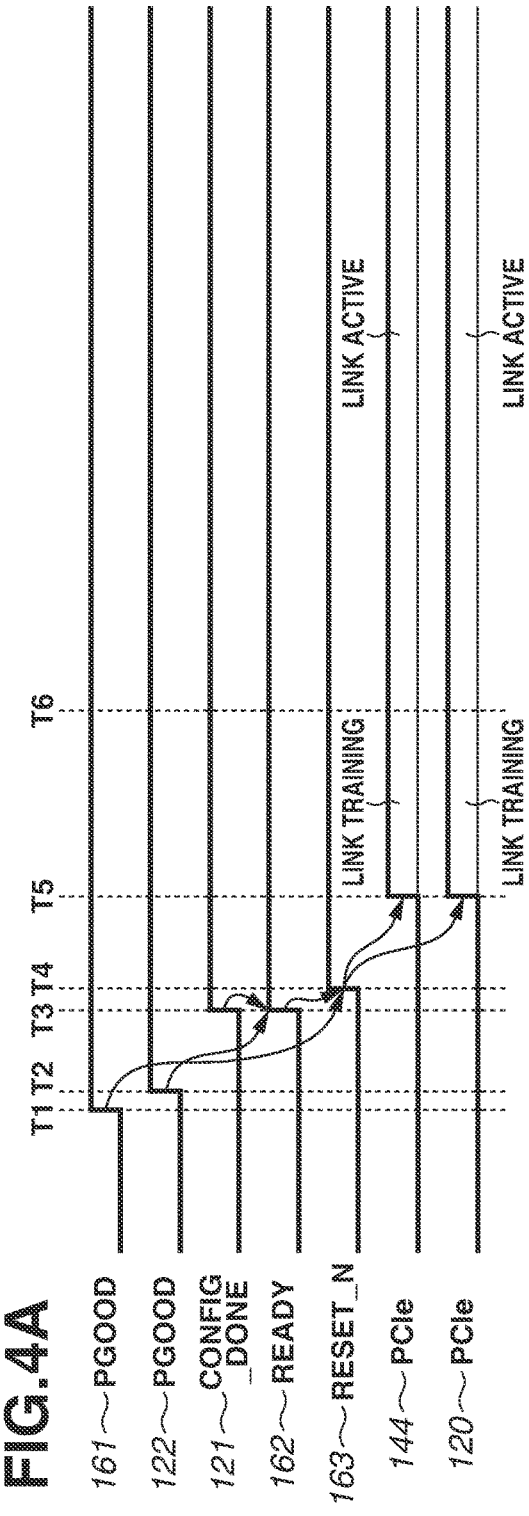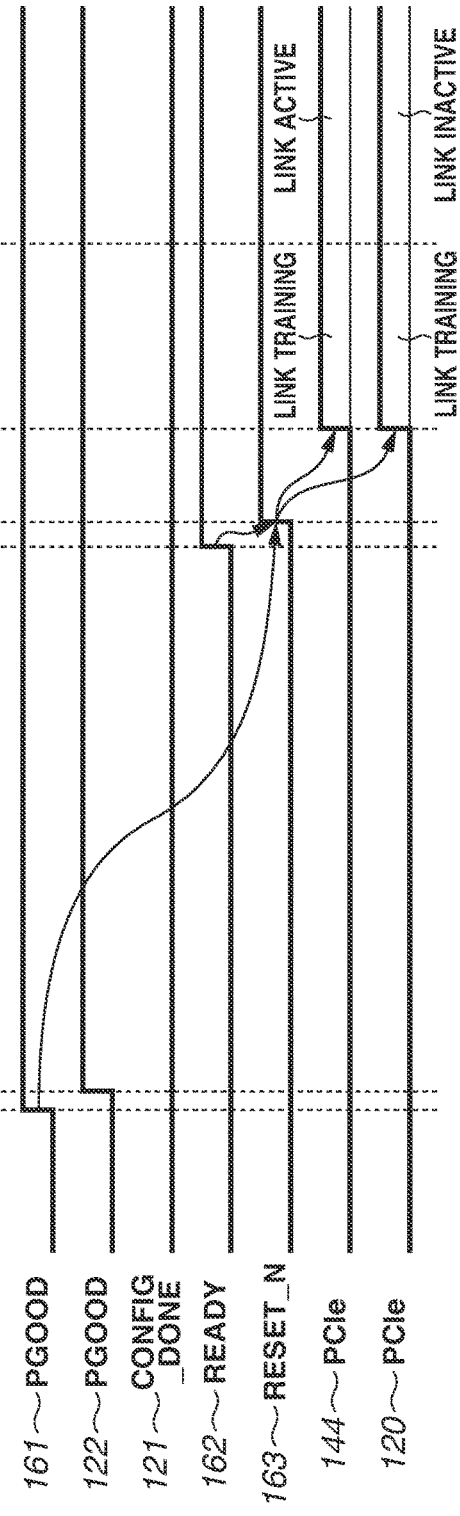

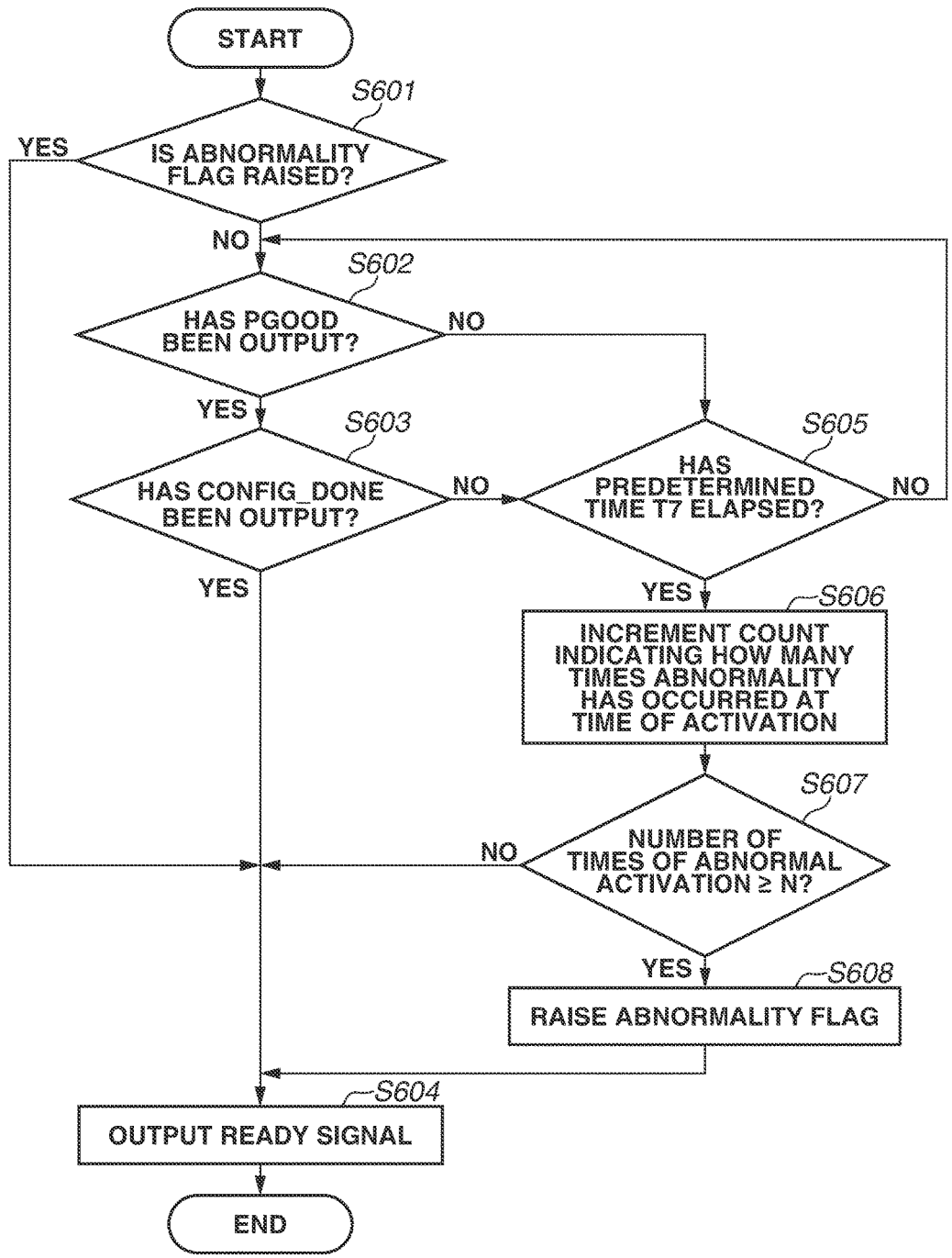

INFORMATION PROCESSING APPARATUS, METHOD FOR CONTROLLING INFORMATION PROCESSING APPARATUS, AND STORAGE MEDIUM FOR ESTABLISHING LINK-UP BETWEEN COMMUNICATION DEVICES

BACKGROUND OF THE INVENTION

Field of the Invention

The present invention relates to an information processing apparatus, a method for controlling an information processing apparatus, and a storage medium.

Description of the Related Art

In recent years, for example, Peripheral Component Interconnect Express (PCI Express) (registered trademark) (hereinafter referred to as PCIe)) has been widely used by information processing apparatuses including personal computers (PCs) as a communication standard for data communication requiring a wide bandwidth.

The PCIe standard defines the following specification. Within 100 milliseconds (ms) since a reset is released after power is supplied to a device, the device should complete initialization processing thereof, and start a link training sequence. Then, the device should complete processing for establishing a link to achieve link-up, thereby shifting to a state capable of receiving a configuration request.

Further, on the other hand, it has been becoming common to use a device having an arbitrarily configurable logical circuit, such as a field-programmable gate array (FPGA), as the PCIe device. The use of the FPGA as the PCIe device requires completion of configuration of the FPGA including a PCIe control unit, which will serve as an endpoint, before the link training sequence starts after the power is supplied to the device.

Generally, the configuration of the FPGA takes a different time until the completion thereof depending on a size of circuit information. This means that it also takes a different time until the completion of the initialization processing and the start of the link training sequence depending on the size of the circuit information.

When the time taken for the initializing processing varies for each device supposed to communicate or the time taken until the start of the link training sequence varies depending on the size of the circuit information of the FPGA in this manner, the following problem arises. This variation may raise such a problem that one of devices cannot complete the initialization processing thereof, making it impossible to secure a time required for the link training sequence within the time period specified by the standard.

Therefore, the following method is proposed to solve the problem of being unable to achieve the link-up between the communication devices. For example, there is proposed a method that performs control of, with respect to power supply to a PCIe communication device, delaying the power supply so as to supply power after receiving a notification indicating completion of activation processing of a PCIe communication device for which the initializing processing takes a long time (Japanese Patent Application Laid-Open No. 2012-022477).

This method performs the control of delaying the power supply so as to synchronize timings when the PCIe communication devices start the link training sequence, thereby ensuring that the link-up can be achieved.

However, the above-described method results in an increase in an activation time in terms of activation of the entire system because this method delays the timing of supplying the power to the PCIe communication device. The information processing apparatuses are desired to be able to be booted up in a shorter time after being powered on, so that the increase in the activation time of the entire system is undesirable.

Further, in a system including a plurality of PCIe communication devices connected to one another, no power is supplied to the PCIe communication devices if some abnormality has occurred and even only one PCIe communication device has failed to normally complete the activation processing thereof. Therefore, the system ends up in a state incapable of connecting to all of the PCIe communication devices.

SUMMARY OF THE INVENTION

According to an aspect of the present invention, an information processing apparatus as one exemplary embodiment of the present invention includes the following configuration.

An information processing apparatus, in which a first controller including a first communication unit and a second controller including a second communication unit perform processing in communication with each other, includes a signal generation unit configured to generate a third signal from a first signal indicating that communication of the second communication unit can be established by power supplied from a power source unit and a second signal indicating that the communication of the second communication unit cannot be established by the power supplied from the power source unit, and a reset unit configured to release a reset signal output to the first controller or the second controller according to reception of the third signal.

Further features of the present invention will become apparent from the following description of exemplary embodiments with reference to the attached drawings.

BRIEF DESCRIPTION OF THE DRAWINGS

FIGS. 3A, 3B, and 3C are flowcharts illustrating a method for controlling the information processing apparatus.

FIGS. 4A and 4B are timing diagrams illustrating an operation illustrated in FIG. 1.

FIG. 6 is a flowchart illustrating a method for controlling the information processing apparatus.

DESCRIPTION OF THE EMBODIMENTS

Figure 1:
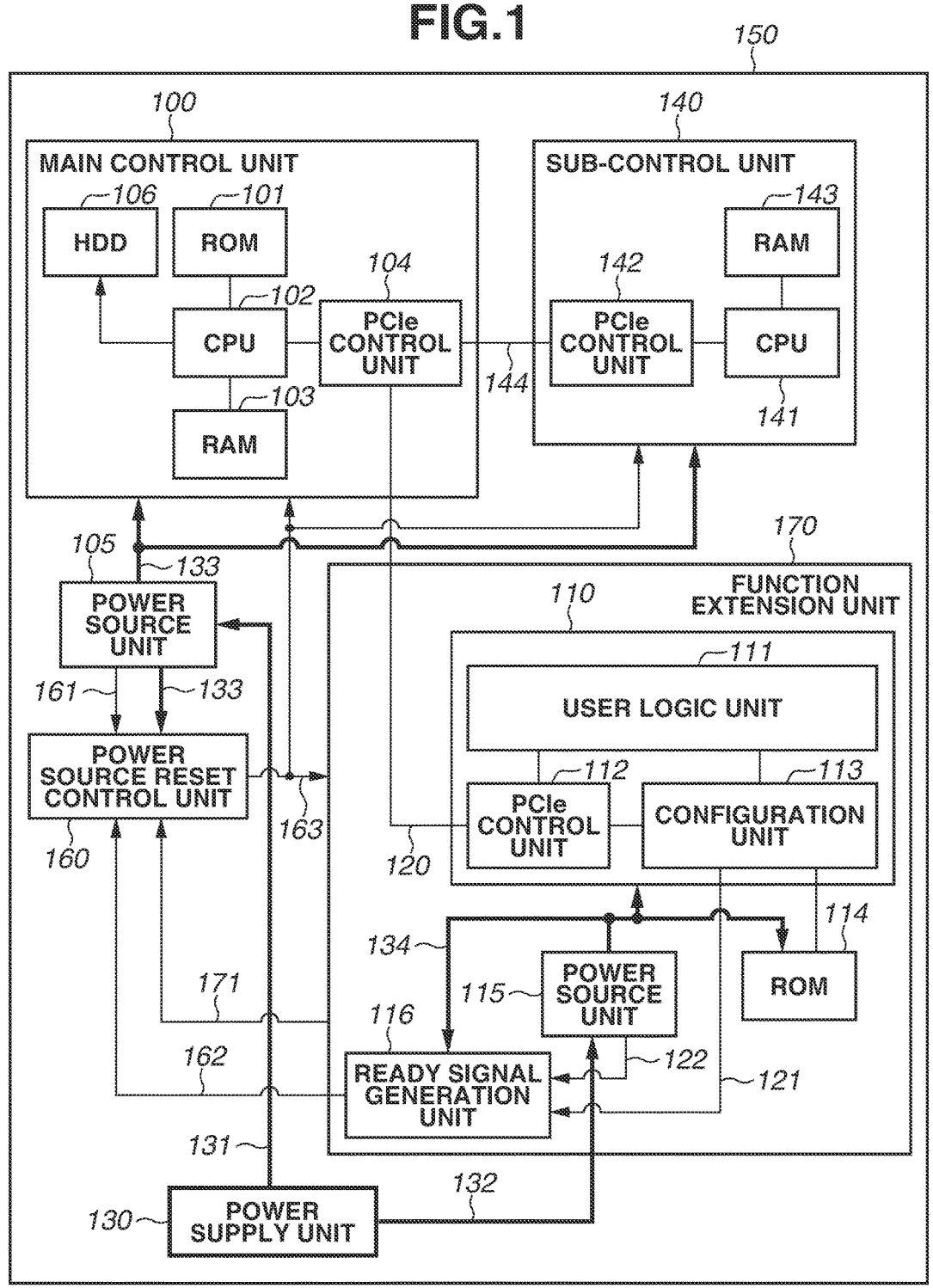
FIG. 1 is a block diagram illustrating a configuration of an information processing apparatus.

Next, exemplary embodiments of the present invention will be described with reference to the drawings.
<Description of System Configuration>
FIG. 1 is a block diagram illustrating a configuration of an information processing apparatus indicating a first exemplary embodiment. In the present exemplary embodiment, assume that possible types of the information processing apparatus include a printing apparatus, an image forming apparatus, and a multifunction image forming apparatus.

In FIG. 1, an information processing apparatus 150 includes a main control unit 100, a sub-control unit 140, a function extension unit 170, a power supply unit 130, a power source reset control unit 160, and a power source unit 105. The main control unit 100 will be referred to as a first controller, and the sub-control unit 140 and the function extension unit 170 will be each referred to as a second controller.

The main control unit 100 includes a read only memory (ROM) 101, a central processing unit (CPU) 102, a random access memory (RAM) 103, a PCIe control unit 104, and a hard disk drive (HDD) 106. The ROM 101 contains a boot program (a Basic Input/Output System (BIOS)), an operating system (OS), and an application program. The power source unit 105 converts direct-current (DC) power 131 supplied from the power supply unit 130 into an appropriate voltage required by the main control unit 100 and the sub-control unit 140. Then, upon stabilization of the converted voltage, the power source unit 105 notifies the power source reset control unit 160 of that via a Power Good (PGOOD) signal 161. When the power source unit 105 supplies power 133 to the main control unit 100, and the power source reset control unit 160 releases a reset signal 163, the CPU 102 reads out the boot program from the ROM 101 and starts an operation. At this time, the power source reset control unit 160 releases the reset signal 163 output to the main control unit 100, the sub-control unit 140, or the function extension unit 170 according to reception of a READY signal, which is a third signal.

The RAM 103 temporarily stores data when the CPU 102 executes a program, and data read out from the HDD 106. The HDD 106 stores data processed or to be processed on the program that runs by the CPU 102.

The PCIe control unit 104 is connected to a PCIe control unit 142 of the sub-control unit 140 via a PCIe bus 144, and provides and receives data to and from the sub-control unit 140. Further, the PCIe control unit 104 is connected to a PCIe control unit 112 of an FPGA 110 via a PCIe bus 120, and provides and receives data to and from the FPGA 110. The PCIe control unit 142 will be referred to as a second communication unit.

The PCIe control unit 104 is brought into a state capable of confirming a physical connection by link training without intervention of the CPU 102, when the power 133 is supplied from the power source unit 105 to the main control unit 100 and the reset signal 163 is released by the power source reset control unit 160.

The sub-control unit 140 includes a CPU 141, the PCIe control unit 142, and a RAM 143. The RAM 143 temporarily stores a boot program, and data when the CPU 141 executes a program. The PCIe control unit 142 is brought into the state capable of confirming a physical connection by the link training without intervention of the CPU 141, when the power 133 is supplied from the power source unit 105 to the sub-control unit 140 and the reset signal 163 is released by the power source reset control unit 160.

The PCIe control unit 142 receives data of the boot program of the CPU 141 from the PCIe control unit 104 of the main control unit 100 to then develop the received data into the RAM 143, by which the CPU 141 starts an operation. The function extension unit 170 includes the FPGA 110, a ROM 114, a power source unit 115, and a Ready signal generation unit 116.

The function extension unit 170 is a detachably attachable unit electrically connected to the information processing apparatus 150 via a card edge connector (not illustrated), a general-purpose connector (not illustrated), a general-purpose cable (not illustrated), or the like. In the present exemplary embodiment, the function extension unit 170 is described as the detachably attachable unit by way of example, but the present invention can also be applied to the function extension unit 170 that is not detachably attachable. If the function extension unit 170 is electrically connected to the information processing apparatus 150, the function extension unit 170 outputs a function extension unit detection signal 171.

The function extension unit detection signal 171 is, for example, connected to power 134 by a pull-up connection via a resistor (not illustrated) in the function extension unit 170. Then, the function extension unit 170 may be configured in such a manner that the function extension unit detection signal 171 is output if the function extension unit 170 is electrically connected to the information processing apparatus 150. Further, the function extension unit 170 may be configured in such a manner that a CPU (not illustrated) or the like in the function extension unit 170 outputs the function extension unit detection signal 171.

If the function extension unit 170 is not mounted, the function extension unit detection signal 171 is not output but the information processing apparatus 150 is operable in the configuration including the main control unit 100, the sub-control unit 140, the power source unit 105, the power supply unit 130, and the power source reset control unit 160.

The FPGA 110 includes a user logic unit 111, the PCIe control unit 112, and a configuration unit 113. The user logic unit 111, which functions as a user logic unit for the FPGA 110, is a circuit unit rewritable by the configuration unit 113. The PCIe control unit 112 will be referred to as the second communication unit.

The PCIe control unit 112 is connected to the PCIe control unit 104 of the main control unit 100 via the PCIe bus 120, and provides and receives the data to and from the main control unit 100. In a case where the PCIe control unit 112 is a hard macro of the FPGA 110, setting the PCIe control unit 112 to initial settings thereof should be completed by the configuration unit 113 to bring the PCIe control unit 112 into the state capable of confirming a physical connection by the link training.

The power source unit 115 converts DC power 132 supplied from the power supply unit 130 into an appropriate voltage required by the FPGA 110 and the ROM 114, and notifies the Ready signal generation unit 116 of a PGOOD signal 122 upon stabilization of the converted voltage.

The configuration unit 113 configures the user logic unit 111 and sets the user logic unit 111 and the PCIe control unit 112 to their respective initial settings according to information stored in the ROM 114 upon supply of the power 134 from the power source unit 115 to the FPGA 110. The configuration unit 113 configures the user logic unit 111 and sets the user logic unit 111 and the PCIe control unit 112 to their respective initial settings without waiting for the release of the reset signal 163.

Further, upon completing the configuration based on the information read from the ROM 114, the configuration unit 113 notifies the Ready signal generation unit 116 of this completion via a CONFIG_DONE signal 121.

The ROM 114 stores initial setting information of the PCIe control unit 112 (hereinafter referred to as interface information), configuration information and initial setting information of the user logic unit 111 (hereinafter referred to as core information), and the like.

The Ready signal generation unit 116 generates a Ready signal 162 from states of the CONFIG_DONE signal 121 and the PGOOD signal 122 by a method that will be described below, and notifies the power source reset control unit 160 of the Ready signal 162.

The power source reset control unit 160 releases the reset signal 163 upon being notified of both the PGOOD signal 161 from the power source unit 105 and the Ready signal 162 from the Ready signal generation unit 116, when the function extension unit detection signal 171 is output.

The power source reset control unit 160 releases the reset signal 163 upon being notified of only the PGOOD signal 161 from the power source unit 105, when the function extension unit detection signal 171 is not output.

The power supply unit 130 converts power supplied from an alternating-current (AC) power source (not illustrated) from AC power to DC power, and supplies the DC power 131 and the DC power 132 to the power source unit 105 and the power source unit 115, respectively.

Figure 2:
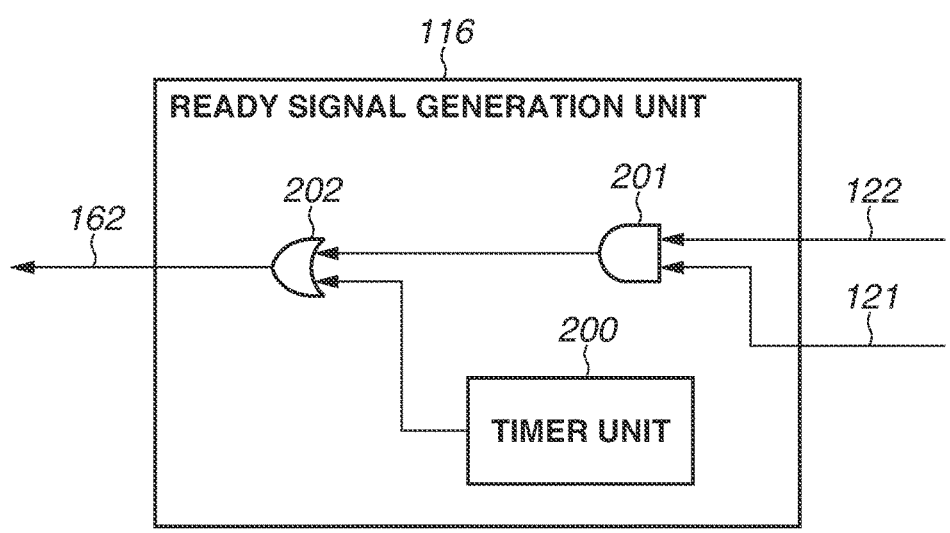
FIG. 2 is a block diagram illustrating a configuration of a Ready signal generation unit.

FIG. 2 is a block diagram illustrating a configuration of the Ready signal generation unit 116 illustrated in FIG. 1.

In FIG. 2, the Ready signal generation unit 116 includes a timer unit 200, an AND gate 201, and an OR gate 202. The AND gate 201 generates a signal (a first signal) acquired by performing an AND operation on the CONFIG_DONE signal 121 and the PGOOD signal 122, and outputs the generated signal to the OR gate 202.

The timer unit 200 measures a time (a predetermined time) elapsed since the start of the supply of the power 134 to the Ready signal generation unit 116, and outputs a signal to the OR gate 202 after the predetermined time has elapsed. The OR gate 202 outputs a signal acquired by performing an OR operation on the signal from the AND gate 201 and the signal from the timer unit 200 (a second signal) to the power source reset control unit 160 as the Ready signal 162 (a third signal). The Ready signal generation unit 116 is assumed to be configured in such a manner that the above-described predetermined time can be determined variably according to a resource of the function extension unit 170.

FIGS. 3A, 3B, and 3C are flowcharts illustrating a method for controlling the information processing apparatus 150 according to the present exemplary embodiment. In particular, FIG. 3A illustrates an example of activation processing of the function extension unit 170 in the information processing apparatus 150.

First, when a system power source (not illustrated) is turned on, the power source unit 115 supplies the power 134 to the FPGA 110. In step S301, the configuration unit 113 reads out the interface information from the RAM 114. In step S302, the configuration unit 113 sets the PCIe control unit 112 to the initial settings thereof.

Upon completing setting the PCIe control unit 112 to the initial settings thereof, in step S303, the configuration unit 113 outputs the CONFIG_DONE signal 121 for notifying the Ready signal generation unit 116 that the configuration is completed (READY notification). At this stage, the PCIe control unit 112 is brought into the state capable of confirming a physical connection by the link training.

Next, in step S304, the PCIe control unit 112 and the PCIe control unit 104 carry out the link training with each other, thereby establishing a physical connection therebetween. If the PCIe control unit 112 determines that the link training with each other has been completed normally in step S305 (YES in step S305), in step S306, the PCIe control unit 112 on the FPGA 110 side responds to a request from the PCIe control unit 104 on the main control unit 100 side. For example, the PCIe control unit 112 transmits a vendor identification (ID) and/or a device ID set to their respective initial settings in step S302 to the main control unit 100 via the PCIe bus 120 in response to a request to transmit the vendor ID and/or the device ID from the main control unit 100.

If the PCIe control unit 112 determines that the link training with each other has not been completed normally in step S304 (NO in step S305), the activation processing ends without a further operation to be performed.

FIG. 3B is an example of activation processing of the main control unit 100 in the information processing apparatus 150 illustrated in FIG. 1.

If the reset signal 163 is released by the power source reset control unit 160 (YES in step S310), in step S311, the PCIe control unit 104 is initialized into the state capable of confirming a physical connection by the link training without the intervention of the CPU 102. Then, in step S312, the PCIe control unit 104, and each of the PCIe control unit 112 and the PCIe control unit 142 carry out the link training with each other, thereby establishing the physical connection therebetween.

After that, in step S313, the CPU 102 reads out the BIOS from the ROM 101 and starts booting up the main control unit 100. During this processing, in step S314, the CPU 102 transmits a request for searching for a device connected at a location beyond each of the PCIe bus 120 and the PCIe bus 144 via the PCIe control unit 104.

If the link training with each other has been completed normally in step S312, the PCIe control unit 112 of the function extension unit 170 and the PCIe control unit 142 of the sub-control unit 140 respond to the request output from the PCIe control unit 104 on the main control unit 100 side. This response to the request allows the main control unit 100 to recognize the sub-control unit 140 and the function extension unit 170 as PCIe devices.

If the PCIe control unit 104 determines that the response to the request is transmitted from all of the PCIe control units 112 and 142 (YES in step S315), the main control unit 100 determines that the activation has been completed normally. Then, in step S316, the main control unit 100 starts a normal operation. Then, the activation processing ends.

Next, if the response to the request is not transmitted from all of the PCIe control units 112 and 142 (NO in step S315), in step S317, the main control unit 110 determines whether the response to the request is transmitted from the PCIe control unit 142 of the sub-control unit 140.

If the response to the request is transmitted from the PCIe control unit 142 but is not transmitted from the PCIe control unit 112 (YES in step S317), in step S318, the main control unit 100 starts an operation together with the sub-control unit 140 as an operation of reduced processing. Then, the activation processing ends.

If the PCIe control unit 104 determines that the response to the request is not transmitted from the PCIe control unit 142 (NO in step S317), in step S319, the main control unit 100 presents a display indicating that an activation error has occurred on a display unit (not illustrated) included in an operation unit (not illustrated). Then, the activation processing ends.

This processing allows a user to confirm that the information processing apparatus 150 cannot detect a specific device (the function extension unit 170 in the present exemplary embodiment) and thus is activated in reduced operation, thereby quickly taking measures after that, such as replacing the device.

FIG. 3C illustrates an example of activation processing of the function extension unit 170 in the information processing apparatus 150 according to the present exemplary embodiment.

If the reset signal 163 is released by the power source reset control unit 160 (YES in step S320), in step S321, the PCIe control unit 142 is initialized into the state capable of confirming a physical connection by the link training without the intervention of the CPU 141. Then, in step S322, the PCIe control unit 142 and the PCIe control unit 104 carry out the link training with each other, thereby establishing the physical connection therebetween.

If the PCIe control unit 142 determines that the link training with each other has been completed normally in step S322 (YES in step S323), in step S324, the PCIe control unit 142 of the sub-control unit 140 responds to the request from the PCIe control unit 104 on the main control unit 100 side. Then, the activation processing ends.

On the other hand, if the PCIe control unit 142 determines that the link training with each other has not been completed normally in step S322 (NO in step S323), the activation processing ends without a further operation to be performed.

FIGS. 4A and 4B are timing diagrams illustrating the operation illustrated in FIG. 1.

In particular, FIG. 4A is a timing diagram illustrating the operation until the main control unit 100, the sub-control unit 140, and the function extension unit 170 illustrated in FIG. 1 are activated normally, and the connection via each of the PCIe bus 144 and the PCIe bus 120 is established.

First, when the system power source (not illustrated) is turned on, the power source unit 105 converts the voltage of the power 131 into the appropriate voltage, and notifies the power source reset control unit 160 of the PGOOD signal 161 upon the stabilization of the converted voltage (time t=T1). Further, the power source unit 115 converts the voltage of the power 132 into the appropriate voltage, and notifies the Ready signal generation unit 116 of the PGOOD signal 122 upon the stabilization of the converted voltage (time t=T2).

Next, the configuration unit 113 notifies the Ready signal generation unit 116 of the CONFIG_DONE signal 121 upon completing the configuration (time t=T3).

The Ready signal generation unit 116 notifies the power source reset control unit 160 of the Ready signal 162 upon being notified of both the PGOOD signal 122 and the CONFIG_DONE signal 121 (time t=T3).

The power source reset control unit 160 releases the reset signal 163 upon being notified of both the PGOOD signal 161 and the Ready signal 162 (time t=T4).

At time t=T5, the PCIe control unit 104, and each of the PCIe control unit 112 and the PCIe control unit 142 start the link training with each other, thereby establishing the physical connection therebetween.

At time t=T6, the CPU 102 transmits the request for searching for a device connected at a location beyond the PCIe bus 120 and the PCIe bus 144 via the PCIe control unit 104. By responding to this request, the PCIe control unit 112 and the PCIe control unit 142 allow the main control unit 100 to recognize the sub-control unit 140 and the function extension unit 170 as the PCIe devices.

FIG. 4B is a timing diagram illustrating the operation until the connection via the PCIe bus 144 is established when the main control unit 100 and the sub-control unit 140 illustrated in FIG. 1 are activated normally but the function extension unit 170 illustrated in FIG. 1 has failed to be activated normally because some abnormality has occurred therein.

First, when the system power source (not illustrated) is turned on, the power source unit 105 converts the voltage of the power 131 into the appropriate voltage, and notifies the power source reset control unit 160 of the PGOOD signal 161 upon the stabilization of the converted voltage (time t=T1). Further, the power source unit 115 converts the voltage of the power 132 into the appropriate voltage, and notifies the Ready signal generation unit 116 of the PGOOD signal 122 upon the stabilization of the converted voltage (time t=T2).

Next, the timer unit 200 measures the time since the start of the supply of the power 134 to the Ready signal generation unit 116, and the Ready signal generation unit 116 forcibly outputs the signal as the Ready signal 162 after the predetermined time has elapsed (time t=T7). The power source reset control unit 160 releases the reset signal 163 upon being notified of both the PGOOD signal 161 and the Ready signal 162 (time t=T8).

At time t=T9, the PCIe control unit 104 and the PCIe control unit 142 start the link training with each other, thereby establishing the physical connection therebetween.

At time t=T10, the CPU 102 transmits the request for searching for a device connected at a location beyond the PCIe bus 144 via the PCIe control unit 104. By responding to this request, the PCIe control unit 142 allows the main control unit 100 to recognize the sub-control unit 140 as the PCIe device.

According to the above-described exemplary embodiment, when the information processing apparatus 150 is activated normally, it can be ensured that the function extension unit 170 is detected as the PCIe device at the time of the processing for searching for a PCIe device, which is performed by the CPU 102 of the main control unit 100. Further, at the same time, the activation time of the entire system can be minimized.

On the other hand, even when an abnormality has occurred in the function extension unit 170, the information processing apparatus 150 can partially operate as the reduced operation.

Next, a second exemplary embodiment will be described with reference to the drawings. Descriptions will be omitted below regarding the drawings and the drawings of the flowcharts already described in the first exemplary embodiment. A difference between the second exemplary embodiment and the first exemplary embodiment is the block diagram of the Ready signal generation unit 116 illustrated in FIG. 2. More specifically, the second exemplary embodiment is different from the first exemplary embodiment in terms of the method for outputting the Ready signal 162 from the states of the CONFIG_DONE signal 121 and the PGOOD signal 122.

Figure 5:
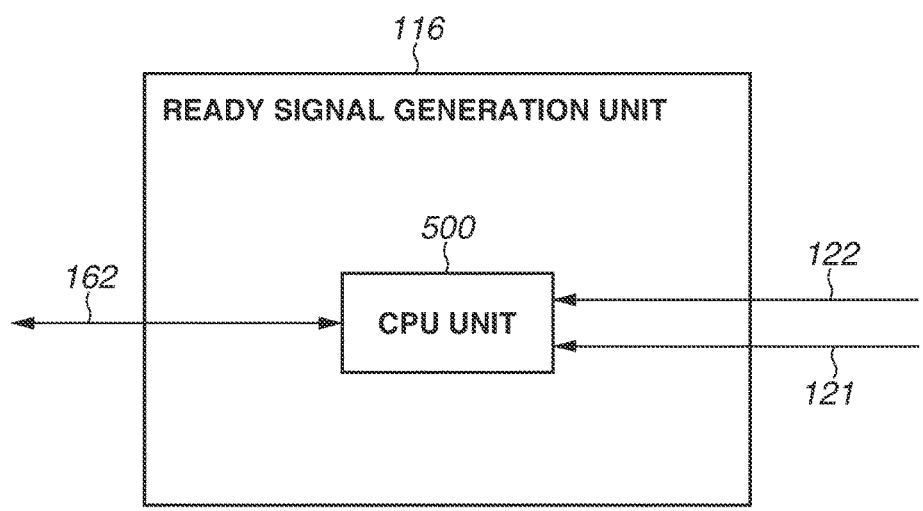
FIG. 5 is a block diagram illustrating a configuration of the Ready signal generation unit.

FIG. 5 is a block diagram illustrating a configuration of the Ready signal generation unit 116 indicating the present exemplary embodiment.

In FIG. 5, the Ready signal generation unit 116 includes a CPU 500. The CONFIG_DONE signal 121 and the PGOOD signal 122 are input, and the CPU 500 determines whether to output the Ready signal 162 from the states thereof by a method that will be described below. The CPU 500 stores information (an abnormality flag) indicating that the function extension unit 170, which is the second controller, is in an abnormal state, if the Ready signal generation unit 116 is kept in such a state that the first signal is not input even after a predetermined time has elapsed, every time the power 134 is supplied from the power source unit 115.

FIG. 6 is a flowchart illustrating a method for controlling the information processing apparatus 150 according to the present exemplary embodiment. The present example is an example of processing in which the CPU 500 determines whether to output the Ready signal 162.

After the power 134 is supplied to the Ready signal generation unit 116, in step S601, the CPU 500 determines whether the abnormality flag is raised. If the CPU 500 determines that the abnormality flag is raised (YES in step S601), the processing proceeds to step S604.

On the other hand, if the CPU 500 determines that the abnormality flag is not raised (NO in step S601), in step S602, the CPU 500 determines whether the PGOOD signal 122 has been output.

If the CPU 500 determines that the PGOOD signal 122 has been output in step S602 (YES in step S602), in step S603, the CPU 500 determines whether the CONFIG_DONE signal 121 has been output. If the CPU 500 determines that the PGOOD signal 122 has not been output in step S602 (NO in step S602), the processing proceeds to step S605.

If the CPU 500 determines that the CONFIG_DONE signal 121 has been output in step S603 (YES in step S603), the processing proceeds to step S604. If the CPU 500 determines that the CONFIG_DONE signal 121 has not been output in step S603 (NO in step S603), the processing proceeds to step S605.

In step S604, the CPU 500 outputs the Ready signal 162. Then, the processing ends.

On the other hand, in step S605, the CPU 500 determines whether the predetermined time t T7 illustrated in FIG. 4 has elapsed after the supply of the power 134. If the CPU 500 determines that the predetermined time has elapsed (YES in step S605), the processing proceeds to step S606.

If the CPU 500 determines that the predetermined time t=T7 has not elapsed after the supply of the power 134 in step S605 (NO in step S605), the processing proceeds to step S602.

In step S606, the CPU 500 increments a count that indicates how many times an abnormality has occurred at the time of the activation. In step S607, the CPU 500 determines whether the number of occurrences of abnormality is N time(s) or more. This N is a number of one or larger. If the CPU 500 determines that the number of occurrences of abnormality is N time(s) or more in step S607 (YES in step S607), the processing proceeds to step S608. If the CPU 500 determines that the number of occurrences of abnormality is not N time(s) or more in step S607 (NO in step S607), the processing proceeds to step S604. In step S608, the CPU 500 raises the abnormality flag. Then, the processing proceeds to step S604.

According to the above-described exemplary embodiment, when the information processing apparatus 150 is activated normally, it can be ensured that the function extension unit 170 is detected as the PCIe device at the time of the processing for searching for a PCIe device, which is performed by the CPU 102 of the main control unit 100. Further, at the same time, the activation time of the entire system can be minimized.

Further, if an abnormality has occurred in the function extension unit 170, the present exemplary embodiment leads to waiting until the time t=T7 has elapsed when an abnormality has occurred for the first time, regarding the activation time taken to make the information processing apparatus 150 partially operable as the reduced operation.

On the other hand, when and after an abnormality has occurred N-th time, the processing proceeds from step S601 to step S604 without waiting until the time=T7 has elapsed, so that the activation time can be minimized.

The present invention can also be realized by the following processing. A program capable of realizing one or more function(s) of the above-described exemplary embodiments is supplied to a system or an apparatus via a network or a storage medium. Then, one or more processor(s) in a computer of this system or apparatus read(s) out the program and execute(s) the program. Further, the present invention can also be realized by a circuit capable of realizing one or more function(s) (for example, an application specific integrated circuit (ASIC)).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-047098, filed Mar. 10, 2015, which is hereby incorporated by reference herein in its entirety.

What is claimed is:

1. An information processing apparatus comprising:
   a controller including a first communication unit;
   a function extension unit including a second communication unit; and
   a resetting circuit configured to output a reset signal to the controller,
   wherein the function extension unit outputs, to the resetting circuit, a signal indicating that communication of the second communication unit can be established after configuration of the second communication unit is completed,
   wherein the resetting circuit stops outputting the reset signal to the controller according to reception of the signal output by the function extension unit,
   wherein the function extension unit comprises a timer configured to measure a time,
   wherein the function extension unit outputs, to the resetting circuit, a signal indicating that communication of the second communication unit can be established based on a time measured by the timer even if the configuration of the second communication unit is not completed, and
   wherein the first communication unit of the controller starts communication with the second communication unit to initiate link training if the resetting circuit stops outputting the reset signal to the controller.

2. The information processing apparatus according to claim 1, wherein the function extension unit outputs the signal if the time measured by the timer exceeds a predetermined time.

3. The information processing apparatus according to claim 2, wherein the predetermined time is determined according to a resource included in the function extension unit.

4. The information processing apparatus according to claim 1, wherein if the controller transmits a search request to the second communication unit and there is not a response to the search request, the controller causes a display to display an error.

5. The information processing apparatus according to claim 1, wherein the function extension unit includes a user logic unit for an FPGA, and a configuration unit.

6. The information processing apparatus according to claim 1, wherein possible types of the information processing apparatus include a printing apparatus, an image forming apparatus, and a multifunction image forming apparatus.

7. A method for controlling an information processing apparatus which comprises a controller including a first communication unit, a function extension unit including a second communication unit, and a resetting circuit configured to output a reset signal to the controller, the method comprising:
  outputting, by the function extension unit to the controller, a signal indicating that communication of the second communication unit can be established after configuration of the second communication unit is completed;
  stopping, by the resetting circuit, outputting the reset signal to the controller according to reception of the signal output by the function extension unit;
  outputting, by the function extension unit to the resetting circuit, a signal indicating that communication of the second communication unit can be established based on a time measured by a timer even if the configuration of the second communication unit is not completed; and
  starting, by the first communication unit of the controller, communication with the second communication unit to initiate link training if the resetting circuit stops outputting the reset signal to the controller.

8. A non-transitory computer-readable storage medium storing a program for causing a computer to perform a method for controlling an information processing apparatus which comprises a controller including a first communication unit, a function extension unit including a second communication unit, and a resetting circuit configured to output a reset signal to the controller, the program comprising:
  a code for outputting, by the function extension unit to the controller, a signal indicating that communication of the second communication unit can be established after configuration of the second communication unit is completed;
  a code for stopping, by the resetting circuit, outputting the reset signal to the controller according to reception of the signal output by the function extension unit; and
  a code for outputting, by the function extension unit to the resetting circuit, a signal indicating that communication of the second communication unit can be established based on a time measured by a timer even if the configuration of the second communication unit is not completed; and
  a code for starting, by the first communication unit of the controller, communication with the second communication unit to initiate link training if the resetting circuit stops outputting the reset signal to the controller.

* * * * *